(12) United States Patent
Ward et al.

(10) Patent No.: US 6,257,985 B1
(45) Date of Patent: Jul. 10, 2001

(54) GLOBAL SHAFT COUPLING

(75) Inventors: Edward J. Ward, Muskego; Mark D. Buckbee, Milwaukee, both of WI (US)

(73) Assignee: Rexnord Corporation, Milwaukee, WI (US)

( * ) Notice: Subject to any disclaimer, the term of this patent is extended or adjusted under 35 U.S.C. 154(b) by 0 days.

(21) Appl. No.: 09/411,705

(22) Filed: Oct. 1, 1999

(51) Int. Cl.$^7$ .................................................. F16D 3/52
(52) U.S. Cl. .............................. 464/80; 464/52; 464/88
(58) Field of Search ................................ 464/52, 51, 80, 464/88, 179, 181, 182, 54

(56) References Cited

U.S. PATENT DOCUMENTS

| | | |
|---|---|---|
| 1,107,315 | 8/1914 | Krebs . |
| 1,501,187 | 7/1924 | Rayfield . |
| 2,186,305 * | 1/1940 | Orr .......................................... 464/80 |
| 2,971,356 | 2/1961 | Reuter et al. . |
| 3,068,665 | 12/1962 | Firth . |
| 3,178,906 | 4/1965 | Ricketts . |
| 3,524,332 | 8/1970 | Callies . |
| 3,635,049 | 1/1972 | Schlotmann et al. . |
| 3,702,545 | 11/1972 | Schlotmann et al. . |
| 3,982,408 | 9/1976 | Wright . |
| 4,536,170 * | 8/1985 | Downey ................................. 464/80 |
| 4,634,400 | 1/1987 | Butzow et al. . |
| 4,813,911 * | 3/1989 | Gabriel et al. ........................ 464/173 |
| 5,318,480 | 6/1994 | Essi et al. . |
| 5,564,982 * | 10/1996 | Gipson et al. .......................... 464/88 |
| 5,611,732 | 3/1997 | Tirumalai . |
| 5,910,049 * | 6/1999 | DeWachter et al. .................... 464/80 |
| 6,080,065 * | 6/2000 | Hindman et al. ....................... 464/88 |
| 6,117,015 * | 9/2000 | Ryan et al. ............................. 464/80 |

FOREIGN PATENT DOCUMENTS

| | | |
|---|---|---|
| 1 475 320 | 2/1971 | (DE) . |
| 657500 | 5/1929 | (FR) . |
| 2653505 | 4/1991 | (FR) . |
| 206327 | 11/1923 | (GB) . |
| 159761 | 3/1979 | (NL) . |
| WO 00/26533 | 5/2000 | (WO) . |

OTHER PUBLICATIONS

Omega Coupling Supplemental Installation Instructions, Rexnord Corporation, Oct. 13, 1988.

Rex Elastomer Products Omega Couplings Catalogue, Rexnord Corporation, Bulletin #4000, 1966.

* cited by examiner

*Primary Examiner*—Lynne H. Browne
*Assistant Examiner*—Aaron M Dunwoody
(74) *Attorney, Agent, or Firm*—Quarles & Brady LLP

(57) ABSTRACT

A global shaft coupling assembly includes first and second hubs adapted to be mounted on first and second shafts to be coupled. The first and second hubs each include a plurality of groups of axially-spaced and axially-aligned apertures. The coupling assembly also includes a pair of composite members positioned around the shaft ends. The composite members include first and second sleeves each having a plurality of groups of apertures. Various ANSI and ISO standard shaft spacings may be obtained by aligning the various hub and sleeve apertures and fastening the hubs and sleeves together with cap screws.

20 Claims, 2 Drawing Sheets

GLOBAL SHAFT COUPLING

FIELD OF THE INVENTION

The invention relates to shaft couplings, and more particularly to shaft couplings for transmitting torque between axially-spaced shafts.

BACKGROUND

It is known to couple axially-spaced shafts such that a driving shaft (e.g., that of a motor) drives a driven shaft (e.g., that of a pump) through a coupling assembly. One particular type of coupling employs a single or multiple-piece elastomeric element capable of drivably coupling shafts having a limited amount of misalignment with respect to one another. Detailed descriptions of elastomeric coupling assemblies may be found, for example, in U.S. application Ser. No. 09/120,948, filed Jul. 22, 1998 and entitled Tearing Configuration for Flexible Element of Elastomeric Coupling; U.S. application Ser. No. 09/182,147, filed Oct. 29, 1998 and entitled Elastomer Coupling Having Cylindrical Surface Hubs; and U.S. Pat. No. 4,634,400, issued on Jan. 6, 1987. The disclosure of each of these references is incorporated herein by reference insofar as they relate to coupling components, their assembly, and their manner of connecting spaced-apart shafts.

Typically, elastomer coupling assemblies include a hub that is mounted to each shaft (such as by being keyed to each shaft or by being fastened to each shaft via a compression bushing) and a flexible element connected to the hubs. The flexible element is often fastened to the hubs by threaded fasteners such as cap screws, which can connect rigid shoes or sleeves of the flex element to the hubs.

One potentially important consideration in coupling a pair of shafts is the distance between shaft ends (hereinafter "DBSE"). The DBSE is particularly important for back pull-out equipment, such as back pull-out pumps. A back pull-out piece of equipment is typically serviced by swinging out an impeller housing at an end of the pump that includes the rotatable pump shaft. A certain minimum DBSE is required to provide clearance for swinging the impeller housing of the piece of equipment open. The American National Standards Institute (hereinafter "ANSI"), the International Organization for Standardization (hereinafter "ISO"), and the Deutsches Institut für Normung (hereinafter "DIN") have suggested certain standard DBSE spacings for various applications.

In the past, two types of coupling assemblies have generally been provided. The first conformed to ANSI standard DBSE spacings and the second conformed to ISO and DIN standard DBSE spacings (referred to in the appended claims collectively as "metric" shaft spacings). Thus, each type of coupling assembly permitted incremental DBSE settings within one of either the ANSI or the ISO and DIN standards. ANSI, ISO, and DIN conforming coupling assemblies typically include hubs tapped for ANSI cap screws or for ISO and DIN standard cap screws, respectively.

The different spacings called for in the ANSI and the ISO and DIN standards have long presented a number of problems for coupling manufacturers and suppliers. For example, a provider of coupling assemblies may receive orders for coupling assemblies from companies situated in various countries. To avoid the administrative confusion of tracking which companies or existing field applications in the various countries require ANSI, ISO, or DIN standard couplings, the provider typically provides coupling components (e.g., hubs, cap screws, shoes, and other elements) which conform to ANSI, ISO, and DIN standards for a range of potential DBSE spacings of coupling assembly users. Although couplings are thereby available for applications in which ANSI, ISO or DIN standard spacings exist, this practice increases production costs resulting from manufacturing multiple parts differing only dimensionally (e.g., different hub bore lengths, different hub shoulder widths, etc.); increases shipping fees due to the combined weight of the many parts; creates potential confusion in matching cap screws and hubs having the same threads; and increased inventory cost due the number of coupling components needed to meet the DBSE requirements of ANSI, ISO or DIN standards.

Another limitation of prior art couplings is the ability of the coupling to be easily mounted upon a pair of shafts where each shaft is fully engaged with its respective hub or compression bushing. When the coupling is mounted, it is most desirable that each shaft passes fully through the bores of the respective hubs or compression bushings. Some limited amount of hub overhang is sometimes permissible for straight bore hubs in certain applications, but full hub-to-shaft engagement is preferred for all hub types and is generally required for compression bushed hubs. Also, although the shafts can extend through and past the hubs (into the center of the coupling), this practice is generally not preferred. Preferably, when the hubs are mounted to the shafts, the inner face of each hub is substantially aligned with the end face of its respective shaft. Such alignment allows a used to quickly mount the hubs in their proper positions upon shafts having standardized spacing in such a manner that the flexible element can be quickly connected to the hubs without moving the hubs on the shafts. This arrangement is desired and often required by original equipment manufacturers and is standard industry practice in many applications. Unfortunately however, conventional hubs which mount upon ANSI—spaced shafts are just described (and which are thereby properly spaced for flexible element connection) generally do not also mount upon ISO or DIN-spaced shafts without some degree of shaft overhang or overextension. A coupling having hubs which can be mounted upon the shafts and aligned with the shaft ends in ANSI, ISO, and DIN spacing increments would be a significant advancement in the art.

In light of the above problems and limitation of prior art couplings, a need exists for a coupling assembly which is easy to assemble and manufacture, adjustable to accommodate incremental DSBE settings in each of the ANSI, ISO, and DIN spacing standards, and which does so preferably with hubs and shaft ends aligned in multiple spacing standards, without increased coupling parts and without the need for coupling components dedicated for each standard. Each one of the preferred embodiments of the present invention described below accomplishes one or more of these results.

SUMMARY

The present invention provides a global coupling assembly that conforms to ANSI, ISO, and DIN standard DBSE spacings without dedicated components such as hubs for each standard. The coupling assembly of the present invention couples the ends of two axially spaced-apart shafts which are generally aligned with one another (or at least are misaligned under an acceptable threshold level).

The coupling assembly of the present invention includes first and second hubs each adapted to be mounted to an end of one of the respective shafts. The hubs preferably include an outer surface into which a plurality of groups of hub apertures are tapped for receiving bolts, cap screws, or other threaded fasteners. The groups of apertures may be axially aligned or staggered. The coupling assembly also includes one or more (and preferably two) flexible coupling members adapted to be fixed to the hubs by bolts or cap screws to join the hubs together. In a highly preferred embodiment of the present invention, each coupling member includes a central elastomeric portion and first and second sleeve portions extending in opposite directions from the central elastomeric portion. The sleeve portions include a plurality of groups of sleeve apertures that are alignable with the groups of hub apertures in various combinations to provide for selective and alternative spacing of the ends of the shafts at the ANSI, ISO, and DIN standard shaft spacings. Most preferably, the hubs are aligned with the ends of the shafts (e.g., the inside end of each hub substantially flush with the end of its respective shaft) in each of the spacings for the ANSI, ISO, and DIN standards.

The present invention therefore permits a global coupling package to be used for a range of standard shaft spacings for each of the ANSI, ISO, and DIN systems.

Still other advantages and features of the present invention, together with the organization and manner of operation thereof, will become apparent from the following detailed description when taken in conjunction with the accompanying drawings wherein like elements have like numerals throughout the drawings.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

DETAILED DESCRIPTION

Figure 1:
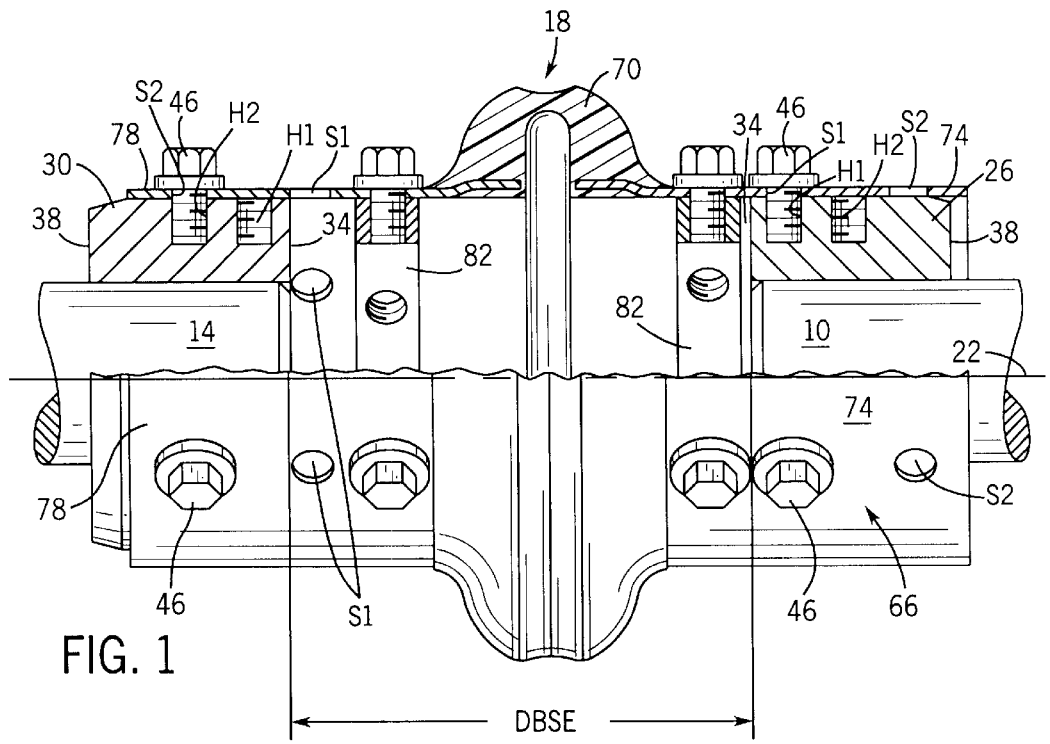
FIG. 1 is a partially cut-away view of a coupling assembly according to the present invention.

FIG. 1 illustrates first and second (e.g., driving and driven) shafts 10, 14 coupled for rotation by a coupling assembly 18. The coupling assembly 18 and shafts 10, 14 are all preferably centered about a single longitudinal axis 22, but can have a limited amount of misalignment with respect to one another.

Figure 3:
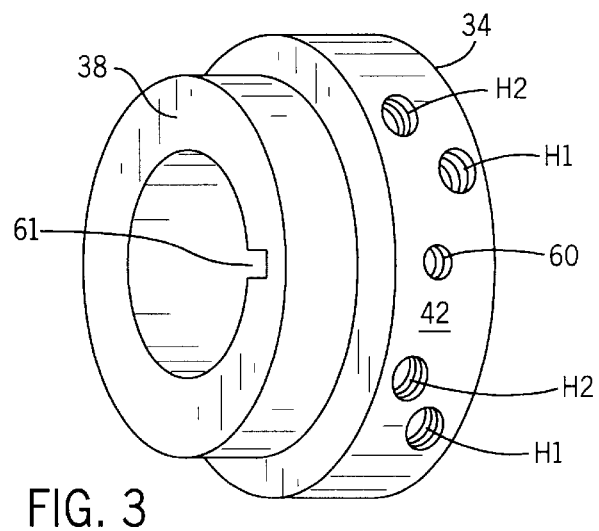
FIG. 3 is a perspective view of an alternative hub for use with the present invention.
Figure 2:
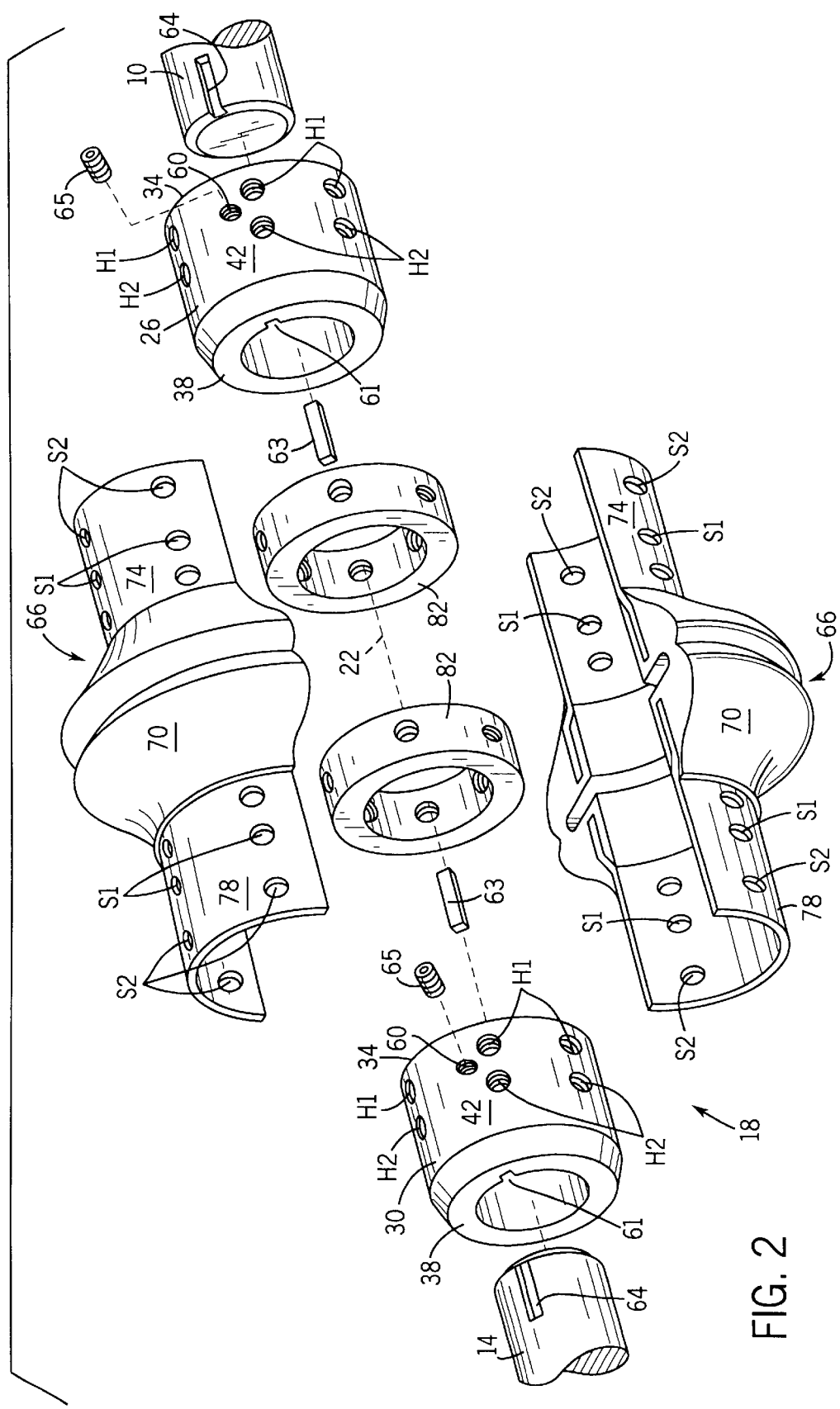
FIG. 2 is an exploded view of the coupling assembly.

FIGS. 1 and 2 illustrate the components of the coupling assembly 18. The coupling assembly 18 includes first and second hubs 26, 30 which are preferably identical and each of which has first and second ends 34, 38 and an outer surface 42. First and second axially-spaced and axially-aligned groups of hub apertures, H1 and H2, respectively, extend radially into each hub 26, 30 a predetermined distance. The hub apertures H1 and H2 are preferably tapped holes for receiving threaded cap screws 46 having one of English or metric standard threads. Because one set of cap screws 46 is preferably provided for each coupling assembly 18, there is no potential for mismatching the threading of the screws and hub apertures H1, H2. Although the illustrated hubs 26, 30 are barrel shaped hubs, the hubs 26, 30 may also be provided with stepped shoulders and the hub apertures H1, H2 may be provided in a staggered pattern where the hub apertures H1, H2 are not axially aligned. FIG. 3 illustrates this type of hub. One having ordinary skill in the art will appreciate that the principles of the present invention can be applied to hubs having many other shapes.

Preferably, a set screw hole 60 is tapped into each hub 26, 30, and extends from the outer surface 42 to a keyway 61 formed in the inner surface of the hub 26, 30. Also preferably, the keyway 61 extends between the ends 34, 38 of the hub. The hubs 26, 30 are keyed to the shafts 10, 14 by inserting a key 63 into the keyways 64 of each shaft 10, 14 and into the keyway 61 of an associated hub, and tightening a set screw 65 against the key 63.

The coupling assembly 18 also includes a pair of semi-circular flexible elements 66 surrounding the axis 22. Each flexible element 66 preferably includes an elastomeric center element 70, and first and second shoes or sleeves 74, 78 which extend in axially opposite directions from the center element 70. Flexible elements having shapes and profiles different from that illustrated in the figures are also possible (e.g., such as different center element and sleeve shapes, sizes, and profiles) The sleeves 74, 78 are preferably encapsulated in the elastomeric material forming the center element 70, but can instead be fastened, clamped, bonded, or attached in any conventional way to the center element 70. The sleeve portions 74, 78 include a plurality of groups of sleeve apertures S1, S2 that are alignable with the groups of hub apertures H1, H2 in various combinations to provide for selective and alternative spacing of the ends of the shafts 10, 14 at the ANSI, ISO, and DIN standard DBSE spacings.

For example, and with reference to FIG. 1, aligning the first group of hub apertures H1 on the first hub 26 with the first group of sleeve apertures Si on the first sleeve 74, and aligning the second group of hub apertures H2 on the second hub 30 with the second group of sleeve apertures S2 on the second sleeve 78 can result in a DBSE of 100 mm, which is one of the ISO standard spacings. However, moving the second hub 30 axially to the right in FIG. 1 to align the first group of hub apertures H1 on the second hub 30 with the first group of sleeve apertures S1 on the second sleeve can result in a DBSE of 3.5 inches, which is one of the ANSI standard spacings. Other standard spacings may be achieved by the following example combinations:

| Hub and Sleeve | Other Hub and Sleeve = | DBSE |
| --- | --- | --- |
| H1S1 | H2S2 | 100 mm |
| H2S1 | H1S2 | 100 mm |
| H1S2 | H1S2 | 140 mm |
| H2S2 | H2S1 | 3.5 in. |
| H1S2 | H2S2 | 5.0 in. |
| H2S2 | H1S1 | 5.0 in. |

Still other ANSI, ISO, and DIN standard spacings can be obtained with various combinations of the hub apertures H1, H2 and the sleeve apertures S1, S2.

Additionally, the hubs may be turned around so that one or both of the hubs has its second end 38 inserted first into the associated sleeve (i.e., opposite that shown in FIG. 1). In FIG. 2, the first hub 26 is illustrated as being turned around in such an orientation. The distance between the first end 34 and the first and second groups of hub apertures H1, H2 is preferably intentionally made different from the distance between the second end 38 and the first and second groups of hub apertures H1, H2 so that reversal of the hubs 26, 30 creates different shaft spacings.

The above example provides for shaft spacings of 100 mm, 140 mm, 3.5 in., and 5.0 in. It is understood that the hubs 26, 30 and sleeves 74, 78 may have apertures H1, H2, S1, S2 that provide wider standard DBSE spacings (e.g., 180 mm, 250 mm, and 7.0 in.). Coupling assemblies 18 can accommodate all of the above-identified standard spacings or may cover only a specified range. Easy-to-follow instructions can be included with the coupling assemblies 18 to direct the end user to the proper combination of sleeve and hub apertures S1, S2, H1, H2 and the proper orientation of the hubs 26, 30 for a desired DESE spacing.

In most preferred embodiments of the present invention, one end 34, 38 of each hub 26, 30 is aligned with the end of the shaft 10, 14 to which it is mounted in each ANSI, ISO, and DIN standard shaft spacing, Therefore, a user desiring to mount the same coupling assembly 18 to shafts which are spaced by ANSI, ISO, or DIN standard distances need only mount the hubs 26, 30 at the ends of the shafts 10, 14 in alignment with the shaft ends. For a number of ANSI, ISO, and DIN shaft spacings, such alignment brings a set of hub apertures H1, H2 in each hub 26, 30 into alignment with a respective set of sleeve apertures S1 and S2 so that the flexible element 66 can be connected to the hubs. When used in another application having a different ANSI, ISO, and DIN shaft spacing, the user still mounts the hubs on the shaft ends (either in the same direction or in a reversed direction). In placing the flexible element 66 upon the hubs 26, 30, a set of hub apertures H1, H2 in each hub 26, 30 again aligns with a respective set of sleeve apertures S1 and S2 in the flexible element 66. Most preferably, a number of ANSI, ISO, and DIN shaft spacings correspond to different aperture alignments of hubs mounted at the ends of the shafts 10, 14.

One or both sleeves 74, 78 can be fitted with an optional high-speed ring 82. The high-speed rings 82 are preferably fastened to the inside of the sleeves 74, 78 to prevent the sleeves 74, 78 from moving radially away from the axis 22 under the influence of centrifugal force in high speed conditions. In some instances, one or both of the high-speed rings 82 may interfere with one or both of the hubs 26, 30 (e.g., where holes H2 of a hub are to be aligned with holes S1 of a sleeve with the first hub end 34 inserted first). If the anticipated operating speed of the coupling assembly 18 does not require high-speed rings 82, in such instances the high-speed ring 82 can be removed to provide clearance for the hub.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, although the preferred embodiments of the present invention described above are with reference to a coupling assembly 18 having straight bore hubs 26, 30, the hubs 26, 30 can instead be compression bushed hubs as are commonly known in the art. As such, alternative hub styles used may not have keys, keyways, and setscrews associated therewith as described in the preferred embodiment of the present invention above. Also, the hubs 26, 30 need not be identical, and can even be of different types (e.g., one hub 26 being a straight bore hub and the other hub 30 being a compression bushed hub).

As another example, the hubs 26, 30 described above and illustrated in the drawings each have two sets of axially spaced hub apertures H1 and H2. Various ANSI, ISO, and DIN DBSE spacings are provided depending upon which hub apertures H1 and H2 are used to secure the flexible element 66 to the hubs 26, 30. It will be appreciated by one having ordinary skill in the art that more sets of hub apertures H1 and H2 can be employed to create even more spacing possibilities for each set of hubs 26, 30. Similarly, more sets of sleeve apertures S1 and S2 can accomplish this same result. The sets of apertures on each hub 26, 30 and the sets of sleeve apertures S1 and S2 on each sleeve 74, 78 need not be axially aligned, and the apertures in each set of hub and sleeve apertures need not be equally radially spaced (as long as a sufficient number of hub and sleeve apertures match in each hub and sleeve arrangement to connect the flexible element 66 to the hubs 26, 30). Although not preferred, it should be noted that as few as one set of hub apertures H1 or H2 can be used in connection with multiple sets of sleeve apertures S1, S2, etc., or as few as one set of sleeve apertures S1 or S2 can be used in connection with multiple sets of hub apertures H1 or H2 to provide for various ANSI, ISO, and DIN DBSE spacings. However, these latter alternatives will generally result in a fewer number of possible spacings for each hub pair.

What is claimed is:

1. A coupling assembly for coupling a driving shaft to a driven shaft, the coupling assembly comprising:

a first hub having at least two groups of hub fastener apertures defined therein, wherein at least one hub fastener aperture of one of said groups is axially spaced from at least one hub fastener aperture of the other group;

a second hub having at least two groups of hub fastener apertures defined therein;

a flexible element having a first end with at least two groups of fastener apertures defined therein and a second end with at least two groups of fastener apertures defined therein;

the first and second hubs connectable to the first and second ends of the flexible element in a number of different relative orientations in which a group of hub fastener apertures in each hub is aligned with a respective group of fastener apertures in the first and second ends of the flexible element, respectively, the number of different relative orientations corresponding to at least two different shaft spacings, wherein one of said shaft spacings corresponds to a standard shaft spacing published by a standards organization for use in the United States and said other of said shaft spacings corresponds to a standard shaft spacing published by a standards organization for use in a country other than the United States.

2. The coupling assembly as claimed in claim 1, wherein at least one of the first and second hubs is a compression bushed hub.

3. The coupling assembly as claimed in claim 1, wherein at least one of the first and second hubs is a straight bore hub.

4. The coupling assembly as claimed in claim 1, wherein the flexible element is connectable to the hubs in their respective orientations by threaded fasteners passed through a group of fastener apertures in each hub aligned with a group of fastener apertures in the each of the flexible element ends, respectively.

5. The coupling assembly as claimed in claim 1, wherein the fastener apertures in the flexible element ends are radial apertures.

6. The coupling assembly as claimed in claim 1, wherein the fastener apertures in the hubs are radial apertures.

7. The coupling assembly as claimed in claim 1, wherein the flexible element has a flexing portion made of elastomeric material.

8. The coupling assembly as claimed in claim 1, wherein the first and second ends of the flexible element are sleeves in which the flexible element fastener apertures are defined.

9. The coupling assembly as claimed in claim 1, wherein the hubs are reversible upon the shafts for positioning the hubs in at least one of the orientations corresponding to one of the shaft spacings.

10. A coupling assembly for coupling driven and driving shafts having respective shaft ends, the coupling assembly comprising:
    a first hub;
    a second hub;
    each of the first and second hubs having opposite ends, an outer surface, and at least two groups of hub fastener apertures defined therein, wherein at least one hub fastener aperture of one of said groups is axially spaced from at least one hub fastener aperture of the other group;
    a flexible element having opposite ends and at least two groups of fastener apertures defined in each of the opposite ends;
    the flexible element connectable to the first and second hubs in a plurality of orientations corresponding to a plurality of different shaft spacings by selective alignment of a group of fastener apertures in each of the first and second hubs with a group of fastener apertures in each of the opposite flexible element ends, respectively, each shaft end being aligned with a hub in each of the plurality of hub orientations and corresponding shaft spacings, wherein one of said shaft spacings corresponds to a standard shaft spacing published by a standards organization for use in the United States and said other of said shaft spacings corresponds to a standard shaft spacing published by a standards organization for use in a country other than the United States.

11. The coupling assembly as claimed in claim 10, wherein at least one hub is a compression bushed hub.

12. The coupling assembly as claimed in claim 10, wherein at least one hub is a straight bore hub.

13. The coupling assembly as claimed in claim 10, wherein the flexible element has an elastomer portion coupled to sleeve portions extending axially therefrom.

14. The coupling assembly as claimed in claim 10, wherein the flexible element is connectable to the hubs by threaded fasteners received within the flexible element fastener apertures and matching hub fastener apertures.

15. The coupling as claimed in claim 10, wherein the hubs are reversible upon the shafts for positioning the hubs in at least one of the orientations corresponding to one of the shaft spacings.

16. The coupling assembly as claimed in claim 10, further comprising at least one high speed ring connected to the flexible element.

17. A coupling assembly for providing a driving connection between the ends of two aligned spaced apart shafts, the coupling assembly comprising:
    a first hub adapted to surround and be fixed to an end of a first shaft and a second hub adapted to surround and be fixed to an end of the other shaft, said hubs each including a plurality of axially-spaced and axially-aligned groups of hub apertures for housing bolts, wherein at least one hub aperture from one of said groups is axially spaced from at least one hub aperture of a different group;
    a pair of coupling members adapted to be fixed to the hubs by bolts and for joining the hubs together, the coupling members each including
    a central elastomeric portion and
    first and second sleeve portions extending in opposite directions from said central elastomeric portion, said first and second sleeve portions each including a plurality of groups of sleeve apertures, said groups of sleeve apertures being positioned in said first and second sleeve portions so as to be alignable with said groups of hub apertures in various combinations to provide for selective and alternative spacing of the ends of the shafts at different shaft spacings, wherein one of said shaft spacings corresponds to a standard shaft spacing published by a standards organization for use in the United States and said other of said shaft spacings corresponds to a standard shaft spacing published by a standards organization for use in a country other than the United States.

18. The coupling assembly of claim 17, wherein each hub includes two groups of hub apertures and wherein each sleeve includes two groups of sleeve apertures.

19. The coupling assembly of claim 17, wherein each hub includes first and second ends, a first group of hub apertures spaced a first distance from said first end, and a second group of hub apertures spaced a distance from said second end that is greater than said first distance.

20. The coupling assembly of claim 17, wherein each hub includes a keyway and a set screw aperture intersecting said keyway, said assembly further comprising a pair of keys and a pair of set screws, said keys each adapted to couple one of said hubs for rotation with one of the shafts, and said set screws holding said keys within an associated keyway.

* * * * *

UNITED STATES PATENT AND TRADEMARK OFFICE
CERTIFICATE OF CORRECTION

PATENT NO.     : 6,257,985 B1
DATED          : July 10, 2001
INVENTOR(S)    : Edward J. Ward et al.

It is certified that error appears in the above-identified patent and that said Letters Patent is hereby corrected as shown below:

Column 4,
Line 33, after "apertures" [Si] should be -- S1 --.

Column 5,
Line 11, after "desired" [DESE] should be -- DBSE --.

Column 6,
Line 61, after "apertures in" [the] should be deleted.

Signed and Sealed this

Twenty-sixth Day of February, 2002

Attest:

JAMES E. ROGAN
Attesting Officer    Director of the United States Patent and Trademark Office